(12) United States Patent
Rathinam et al.

(10) Patent No.: US 8,681,040 B1
(45) Date of Patent: Mar. 25, 2014

(54) SYSTEM AND METHOD FOR AIDING PILOTS IN RESOLVING FLIGHT ID CONFUSION

(75) Inventors: Sethu R. Rathinam, Cedar Rapids, IA (US); Timothy W. Rand, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1720 days.

(21) Appl. No.: 11/656,092

(22) Filed: Jan. 22, 2007

(51) Int. Cl.
- *G01S 13/74* (2006.01)
- *G01S 13/93* (2006.01)
- *G01S 13/00* (2006.01)

(52) U.S. Cl.
USPC ............ 342/37; 342/29; 342/30; 342/32; 342/42; 342/44; 701/1; 701/3; 701/120; 701/300; 701/301

(58) Field of Classification Search
USPC ........... 342/29–51, 175, 195, 52, 57, 58, 60, 342/450–465; 701/1, 3–18, 120–122, 300; 701/301; 702/1, 57, 66, 75–78; 235/375, 235/384; 455/39, 66.1; 704/200, 270, 275; 340/945, 960, 971
See application file for complete search history.

(56) References Cited

U.S. PATENT DOCUMENTS

| | | | | |
|---|---|---|---|---|
| 3,049,705 A | * | 8/1962 | Owen et al. ................ | 342/57 |
| 3,750,166 A | * | 7/1973 | Dearth ....................... | 342/30 |
| 4,196,474 A | * | 4/1980 | Buchanan et al. .......... | 701/301 |
| 4,839,658 A | * | 6/1989 | Kathol et al. ............... | 342/455 |
| 4,853,700 A | * | 8/1989 | Funatsu et al. .............. | 342/30 |
| 5,334,982 A | * | 8/1994 | Owen .......................... | 342/36 |
| 5,374,932 A | * | 12/1994 | Wyschogrod et al. ...... | 342/36 |
| 5,375,058 A | * | 12/1994 | Bass ........................... | 701/120 |
| 5,381,140 A | * | 1/1995 | Kuroda et al. .............. | 340/961 |
| 5,400,031 A | * | 3/1995 | Fitts ............................ | 342/36 |
| 5,469,371 A | * | 11/1995 | Bass ........................... | 342/450 |
| 5,519,618 A | * | 5/1996 | Kastner et al. ............. | 701/120 |
| 5,596,332 A | * | 1/1997 | Coles et al. ................ | 342/455 |
| 5,629,691 A | * | 5/1997 | Jain ............................ | 340/961 |
| 5,659,475 A | * | 8/1997 | Brown ....................... | 701/120 |
| 5,670,961 A | * | 9/1997 | Tomita et al. .............. | 342/36 |
| 5,677,841 A | * | 10/1997 | Shiomi et al. ............. | 701/120 |
| 5,703,591 A | * | 12/1997 | Tognazzini ................ | 342/30 |
| 5,714,948 A | * | 2/1998 | Farmakis et al. .......... | 340/961 |
| 5,732,384 A | * | 3/1998 | Ellert et al. ................ | 701/120 |
| 5,798,726 A | * | 8/1998 | Schuchman et al. ...... | 342/37 |
| 5,941,929 A | * | 8/1999 | Shiomi et al. ............. | 701/120 |
| 5,999,116 A | * | 12/1999 | Evers .......................... | 342/36 |
| 6,047,233 A | * | 4/2000 | Salvatore et al. .......... | 701/120 |
| 6,081,764 A | * | 6/2000 | Varon .......................... | 701/120 |
| 6,108,523 A | * | 8/2000 | Wright et al. .............. | 455/66.1 |
| 6,154,637 A | * | 11/2000 | Wright et al. .............. | 455/66.1 |
| 6,160,998 A | * | 12/2000 | Wright et al. .............. | 455/66.1 |
| 6,163,681 A | * | 12/2000 | Wright et al. .............. | 455/66.1 |

(Continued)

*Primary Examiner* — Bernarr Gregory
(74) *Attorney, Agent, or Firm* — Donna P. Suchy; Daniel M. Barbieri

(57) ABSTRACT

The present invention is a method for aiding pilots in resolving flight identifier (flight ID) confusion. The method includes receiving a first flight ID in a processing system. The method further includes comparing the first flight ID to a second flight ID. The method further includes providing an alert when the compared first flight ID and second flight ID are at least substantially similar. The first flight ID is associated with a first aircraft, the second flight ID is associated with a second aircraft, the first aircraft and second aircraft being located in substantially proximal airspace.

16 Claims, 3 Drawing Sheets

(56) References Cited

U.S. PATENT DOCUMENTS

| | | | |
|---|---|---|---|
| 6,167,239 A * | 12/2000 | Wright et al. | 455/66.1 |
| 6,173,159 B1 * | 1/2001 | Wright et al. | 455/66.1 |
| 6,308,045 B1 * | 10/2001 | Wright et al. | 701/14 |
| 6,384,783 B1 * | 5/2002 | Smith et al. | 342/450 |
| 6,448,929 B1 * | 9/2002 | Smith et al. | 342/456 |
| 6,531,978 B2 * | 3/2003 | Tran | 342/29 |
| 6,810,322 B2 * | 10/2004 | Lai | 701/120 |
| 6,885,340 B2 * | 4/2005 | Smith et al. | 342/465 |
| 6,892,152 B2 * | 5/2005 | Ramillon et al. | 702/76 |
| 6,990,419 B2 * | 1/2006 | Ramillon et al. | 702/76 |
| 7,043,355 B2 * | 5/2006 | Lai | 701/120 |
| 7,123,192 B2 * | 10/2006 | Smith et al. | 342/455 |
| 7,132,982 B2 * | 11/2006 | Smith et al. | 342/456 |
| 7,248,219 B2 * | 7/2007 | Smith et al. | 342/456 |
| RE39,829 E * | 9/2007 | Smith et al. | 342/450 |
| 7,444,146 B1 * | 10/2008 | Wright et al. | 701/14 |
| 7,457,690 B2 * | 11/2008 | Wilson et al. | 701/3 |
| 7,495,612 B2 * | 2/2009 | Smith | 342/450 |
| 2002/0143553 A1 * | 10/2002 | Migdol et al. | 704/275 |
| 2004/0189521 A1 * | 9/2004 | Smith et al. | 342/456 |
| 2005/0007272 A1 * | 1/2005 | Smith et al. | 342/29 |
| 2006/0027651 A1 * | 2/2006 | Berckefeldt | 235/384 |

* cited by examiner

SYSTEM AND METHOD FOR AIDING PILOTS IN RESOLVING FLIGHT ID CONFUSION

FIELD OF THE INVENTION

The present invention relates to the field of situational awareness and particularly to a system and method for aiding pilots in resolving flight ID confusion.

BACKGROUND OF THE INVENTION

Each aircraft generally has a flight identifier (i.e. Flight ID) for allowing Air Traffic Controllers to direct voice radio communication instructions specifically to that aircraft and to further allow Air Traffic Controllers to coordinate the activities of multiple aircraft which are located in the same airspace. For example, most scheduled air taxis, commuter and air carrier airlines use flight numbers as their radio callsigns. However, for most air carriers and commuters, flight numbers are not assigned by a regulatory authority, such as the Federal Aviation Administration (FAA), but rather by the respective airline's marketing department or some other entity, and thus, may not be tightly monitored. Further, Fixed-Based Operators (FBOs), general aviation aircraft, and most non-scheduled air taxis use aircraft tail numbers (the numbers or the number-and-letter combination) as their radio callsigns. Although these tail numbers may be regulatory authority-assigned, owners or operators of these corporate, FBO or air taxi aircraft may request "personalized" tail numbers, which in some cases may result in a whole family of aircraft having similar or similar-sounding numbers and letters in their tail numbers. Therefore, whether an aircraft uses a tail number assigned by a regulatory authority, such as the FAA, as its flight ID or radio callsign, or whether an aircraft uses a flight number that is not assigned by a regulatory authority as its flight ID or radio callsign, confusion may inadvertently arise. For instance, flight numbers, tail numbers or N-numbers assigned to two different aircraft may actually match, have only one character that is different, have characters that are transposed, or happen to sound similar when broadcast as callsigns over voice radio, etc. This is particularly problematic, for example, in that, if 2 aircraft sharing the same airspace have matching or similar sounding flight IDs or callsigns, confusion between pilots and air traffic controllers may occur, which can result in loss of required separation between aircraft, and can possibly cause accidents. The Aviation Safety Reporting System (ASRS) receives a large number of reports regarding Flight ID (ex—callsign) similarities and confusion, as air traffic and voice radio transmissions increase. Most of the time, the reports indicate only momentary confusion or minor infractions of a clearance. However, other reports relate incidents as severe as near midair collisions (NMACs) or serious losses of separation.

A number of additional factors may increase the likelihood of "like sounding" callsigns or flight IDs being misheard. For example, poor voice radio communication technique, such as using an abbreviated version of the callsign or flight ID, not annunciating the callsign or flight ID clearly, or not paying adequate attention to detail during readback/hearback may be a factor. Other factors may include: workload-related fatigue/stress on the pilot or controller; frequency congestion (which may promote 2 or more matching or like-sounding flight IDs/callsigns being on the same channel); controllers getting flights confused when working more than one frequency; pilots becoming distracted from concentrating on voice radio transmissions to and from the controller due to having to simultaneously monitor other cockpit instrumentation; etc. Further, the Air Transport Association has recently recommended reducing separation distance requirements for aircraft in order to more efficiently utilize airspace and reduce airport delays as air traffic increases. Therefore, it may become increasingly important to quickly resolve flight ID confusion for pilots due to the tighter spacing and lower margin for error.

Thus, it would be desirable to provide a system and method for aiding pilots in resolving flight ID confusion which addresses the problems associated with current solutions.

SUMMARY OF THE INVENTION

Accordingly, an embodiment of the present invention is directed to a method for aiding pilots in resolving flight identifier (flight ID) confusion, including: receiving a first flight ID in a processing system; comparing the first flight ID to a second flight ID; and providing an alert when the compared first flight ID and second flight ID are at least substantially similar, wherein the first flight ID is associated with a first aircraft, the second flight ID is associated with a second aircraft, the first aircraft and second aircraft being located in substantially proximal airspace.

A further embodiment of the present invention is directed to a computer-readable medium having computer-executable instructions for performing a method for aiding pilots in resolving flight identifier (flight ID) confusion, said method including: receiving a first flight ID in a processing system; comparing the first flight ID to a second flight ID; and providing an alert when the compared first flight ID and second flight ID are at least substantially similar, wherein the first flight ID is associated with a first aircraft, the second flight ID is associated with a second aircraft, the first aircraft and second aircraft being located in substantially proximal airspace.

An additional embodiment of the present invention is directed to a system for aiding pilots in resolving flight identifier (flight ID) confusion, including: a memory; a processor configured for being communicatively coupled to the memory, the processor being configured for receiving a first flight ID, the processor further being configured for comparing the first flight ID to a second flight ID, the second flight ID being at least one of received by the processor and stored in the memory of the system; and an alerting device configured for being communicatively coupled with the processor, the alerting device configured for providing an alert when the compared first flight ID and second flight ID are at least substantially similar, wherein the first flight ID is associated with a first aircraft, the second flight ID is associated with a second aircraft, the first aircraft and second aircraft being located in substantially proximal airspace.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
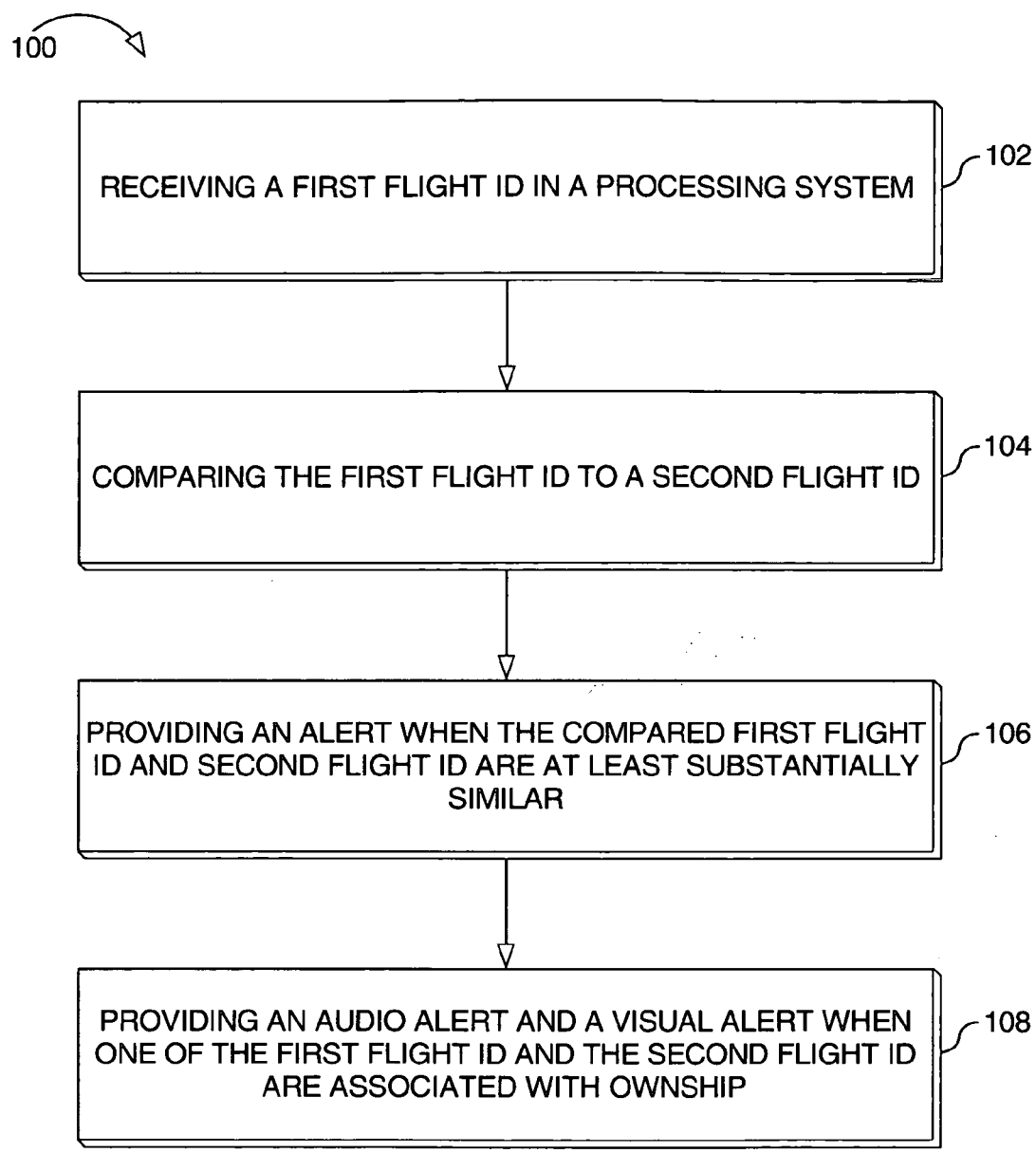
FIG. 1 is a flowchart illustrating a method for aiding pilots in resolving flight ID confusion in accordance with an exemplary embodiment of the present invention.

Reference will now be made in detail to the presently preferred embodiments of the invention, examples of which are illustrated in the accompanying drawings.

A flight ID may be associated with a particular aircraft and may serve to identify that aircraft. For example, air traffic controllers typically address an aircraft via voice radio communications from an air traffic control facility. During such communications, the controller may address an aircraft by its flight ID during its flight so as to direct instructions to the pilot of that particular aircraft, which allow the controller to safely coordinate the activities of that aircraft. When the pilot of the addressed aircraft hears an air traffic controller call out the aircraft's flight ID, the pilot can be aware that the air traffic controller is addressing the pilot's aircraft and can be prepared to follow the air traffic controller's subsequent instructions, answer the controller's questions, etc. In turn, the pilot of the addressed aircraft may call out the aircraft's flight ID when making voice radio communications back to the tower, so as to identify for the controller which aircraft is making the announcement and/or to verify that the controller's instructions have been heard. Further, a particular aircraft may be equipped with a transponder unit for broadcasting or emitting a signal, such as via an antenna, the signal containing the flight ID identifying that particular aircraft. The aircraft may also be configured for broadcasting signal information via the transponder which provides the aircraft's altitude, positional information, and the like. The broadcast signal(s) including the flight ID, altitude, and positional information may be received by the air traffic control facility, such as via a radar antenna, and displayed at the air traffic control facility, such as via a Cathode Ray Tube (CRT) screen. Additionally, the air traffic control facility may receive like signals from all transponder-equipped aircraft within its control area, thereby allowing controllers at the air traffic facility to maintain an ongoing (i.e., updated) picture of the relative positions of each aircraft in its control area (ex—airspace). Using the received flight ID and positional information, the air traffic controller may then orally communicate via voice radio with pilots of each aircraft in the controller's control area to provide instructions for ensuring that air traffic within the control area is properly coordinated and that proper separation between aircraft is being maintained.

As a supplemental measure, some aircraft may be equipped, such as via transponders, to receive/transmit positional and flight ID information to and from other aircraft within a determined range for allowing pilots of each aircraft within the determined range to monitor the relative positions of all aircraft within that determined range. Such monitoring functionality may assist pilots in maintaining proper separation from the other aircraft in the determined range, so as to avoid Near Mid-Air Collisions (NMACs) or worse. As previously discussed, confusion may still arise between pilots and air traffic controllers when two aircraft have the same flight IDs, similar flight IDs, or "similar sounding" (when broadcast) flight IDs.

FIG. 1 illustrates a method for aiding pilots in resolving flight identifier (flight ID) confusion in accordance with an exemplary embodiment of the present invention. In a present embodiment, a method 100 for aiding pilots in resolving flight ID confusion includes receiving a first flight ID in a processing system 102. In an exemplary embodiment, the first flight ID is associated with a first aircraft. For instance, the first flight ID may be a flight number, an aircraft tail number (ex—numbers or number-and-letter combination), a callsign (which may be the radio telephony version of the flight ID and may be the same as the flight ID but is not necessarily so), or the like for identifying the first aircraft. Further, the aircraft may be a scheduled air taxi, a commuter airline, an air carrier airline, a Fixed-Based Operator (FBO), a general aviation aircraft, a non-scheduled air taxi, or the like.

Figure 2:
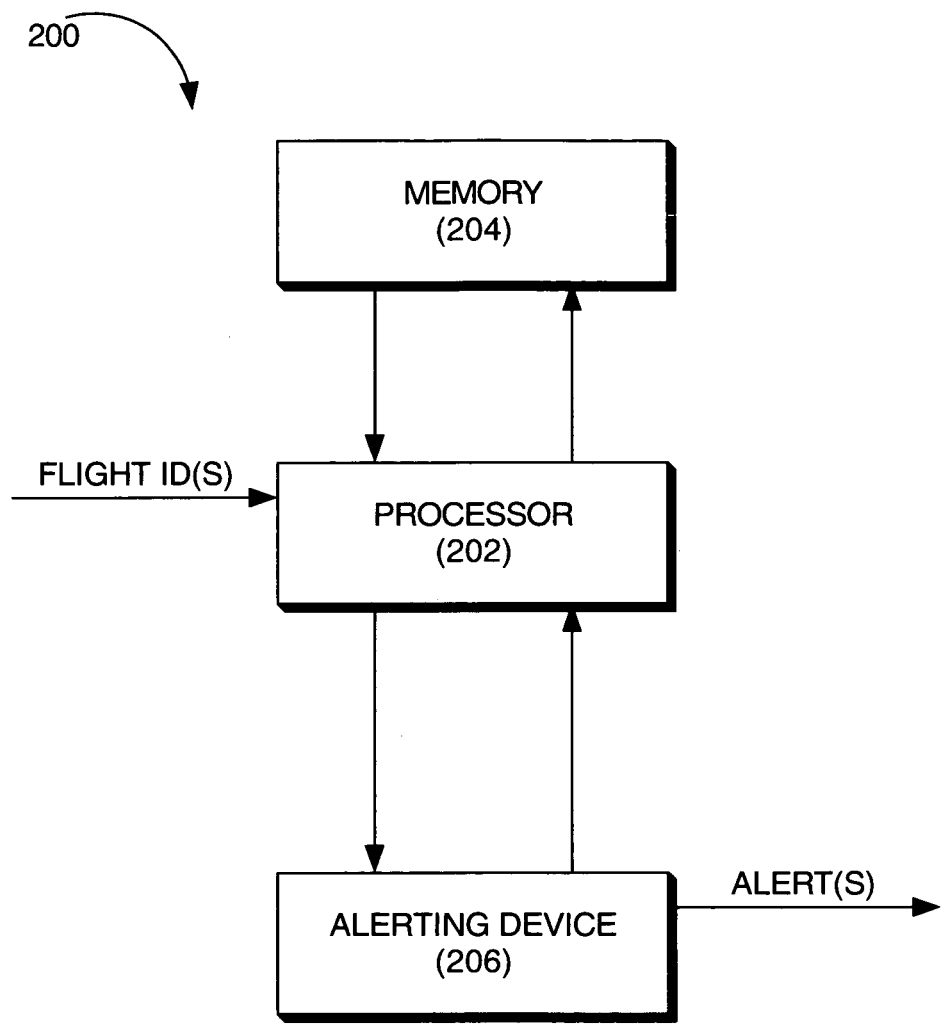
FIG. 2 is a block diagram illustrating a system for aiding pilots in resolving flight ID confusion in accordance with an exemplary embodiment of the present invention.

In the present embodiment, the processing system 200 (FIG. 2) may be a surveillance receiver/processor product configurable for implementation on an aircraft. For example, the processing system 200 may be a Traffic Alert & Collision Avoidance System (TCAS). In alternative embodiments, the processing system 200 may be a Traffic Alert & Collision Avoidance System (TCAS) with Automatic Dependent Surveillance Broadcast (ADS-B) functionality (i.e., a Traffic Computer). In further embodiments, the processing system 200 may be a Configurable Integrated Surveillance System (CISS), such as the CISS 2100 by Rockwell Collins. In additional embodiments, the processing system 200 may be an Integrated Surveillance System (ISS). In still further embodiments, the processing system 200 may be a Traffic Surveillance System (TSS), such as the TSS 4100 by Rockwell Collins. In alternative embodiments, the processing system 200 may be configurable for implementation at an Air Traffic Control facility. In still further embodiments, the processing system 200 may be configured with at least one of ADS-B and Traffic Information Service Broadcast (TIS-B) receiving functionality.

In current embodiments, the method 100 further includes comparing the first flight ID to a second flight ID 104. In an exemplary embodiment, the second flight ID is associated with a second aircraft. For instance, the second flight ID may be a flight number, an aircraft tail number, an N-number (ex—numbers or number-and-letter combination), a callsign (which may be the radio telephony version of the flight ID and may be the same as the flight ID but is not necessarily so), or the like for identifying the second aircraft. Further, the second aircraft may be a scheduled air taxi, a commuter airline, an air carrier airline, a Fixed-Based Operator (FBO), a general aviation aircraft, a non-scheduled air taxi, or the like. In the current embodiments, the first aircraft and the second aircraft are located within substantially proximal airspace. For example, the first aircraft and the second aircraft may both be located within the same zone/center, sector, Terminal Radar Approach control (TRACON) section, local airport section of airspace or the like. In a present embodiment, the second flight ID may be a previously received flight ID which has been received by a processor 202 and placed into/stored in a memory 204 of the processing system 200, the memory 204 being configured for being communicatively coupled with the processor 202. In an exemplary embodiment, the processor 202 of the processing system 200, which is configured for being communicatively coupled with the memory 204, is further configured to receive the first flight ID and to compare the first flight ID with the second flight ID (which is stored in memory 204).

In exemplary embodiments, the comparison step 104 is done to determine if a.) the first flight ID and the second flight ID are at least substantially similar. In a present embodiment "at least substantially similar" flight IDs may include flight IDs that match/are identical (i.e. have the same amount of and same sequence of numbers and/or letters) (Ex—first flight ID is UPS123 and the second flight ID is UPS123). In further examples, "at least substantially similar" may encompass or include flight IDs which may be potentially confusing when broadcast such as flight ID numbers that: have one number, letter, etc. that is different (Ex—first flight ID is UPS123 and second flight ID is UPS133); have one additional/fewer number(s) or letter(s) (Ex—first flight ID is UPS123 and second flight ID is PS123); have transposed numbers/letters (Ex—first flight ID is 691 and second flight ID is 961); are "similar sounding" when broadcast, or the like. In exemplary embodiments, a defined threshold as to which compared flight IDs meet the "at least substantially similar" criteria may be established via algorithmic development work. In additional embodiments, every pair of flight IDs received by the processing system 200 may be compared against one another to determine if any pair of flight IDs are "at least substantially similar".

In further embodiments, the method 100 further includes providing an alert when the compared first flight ID and second flight ID are at least substantially similar 106. In a present embodiment, the system 200 may include an alerting device 206 for providing an alert, such as one or more of a visual alert, an audio/audible alert, or the like. For example, the alerting device 206 may be a display (such as a graphical user interface (GUI)), a speaker, or a combination thereof. In exemplary embodiments, when the compared first flight ID and second flight ID are at least substantially similar, a visual alert, such as a textual message or indicator light, may be provided via the alerting device 206, such as a display or a graphical user interface (GUI), of the system 200. For example, if the first flight ID and second flight ID match (ex—first flight ID is UPS123 and second flight ID is UPS123), but neither the first flight ID, nor the second flight ID are associated with the aircraft implementing the system 200, a textual message may appear via the alerting device 206 (ex—display) indicating to a pilot of the aircraft implementing the system 200 that two aircraft, located in substantially proximal airspace with the pilot's aircraft have matching flight IDs. Such an alert may then allow the pilot of the system-implementing aircraft to be aware of and/or monitor the situation involving the other two aircraft. In further embodiments, if the compared first flight ID and second flight ID match, and at least one of the first aircraft and the second aircraft is ownship (i.e, is the aircraft on which the system 200 is implemented), a visual alert via the alerting device 206 and an audio alert (ex—such as synthesized voice instructions emitted via a speaker integrated as part of the alerting device 206) may both be provided to the pilot of the system-implementing aircraft as a "double warning", so as to increase the likelihood that the pilot may quickly be made aware of this potentially dangerous situation involving the pilot's aircraft. This may be helpful in that the pilot of the aircraft implementing the system 200, after receiving the alerts, may make a voice radio communication to the air traffic controller for that airspace, thereby bringing the problem to the controller's attention, so that the controller can come up with a way to safely coordinate activities of the pilot's aircraft (and other aircraft) located within that airspace.

In still further embodiments, if the compared first flight ID and the second flight ID are determined by the system 200 as not matching, yet are determined as being "similar sounding" and/or "potentially confusing", the pilot of the system-implementing aircraft may be provided with an alert, such as a visual alert or audio alert (when neither the first flight ID nor the second flight ID are associated with ownship) or multiple alerts, such as both visual and audio alerts (when one of the first flight ID and the second flight ID are associated with ownship). For example, when the compared first flight ID and the second flight ID are determined by the system 200 as not matching, yet being "similar sounding" and/or "potentially confusing", and one of the first flight ID and the second flight ID are associated with ownship, the pilot of the system-implementing aircraft may then be made aware of the situation via an alert, such as a visual alert (ex—flagging of the aircraft on the alerting device 206 (ex—display) which have at least substantially similar flight IDs) and/or an audio alert (ex—synthesized voice instructions), provided via a speaker integrated as part of the alerting device 206, so that the pilot may know to: 1) pay particularly closer attention to flight IDs broadcast via voice radio communications by the air traffic controller for that airspace, so as to correctly distinguish instructions intended for that pilot's aircraft; and 2) make a specific point to clearly annunciate his aircraft's flight ID when voicing voice radio communications to the controller, so as to promote decreased risk of confusion and aversion of potential accidents.

In current embodiments, the alerting device 206 may be configured for being communicatively coupled with the processor 202. In present embodiments, the alerting device 206 may be at least one of: an air traffic display and an alert display. In exemplary embodiments, the alerting device 206 may be a Cockpit Display of Traffic Information (CDTI) display, an Integrated Multi-Function Display (iMFD), an Engine Indication and Crew Alerting System (EICAS) display, or an Electronic Flight Bag (EFB) display.

Figure 3:
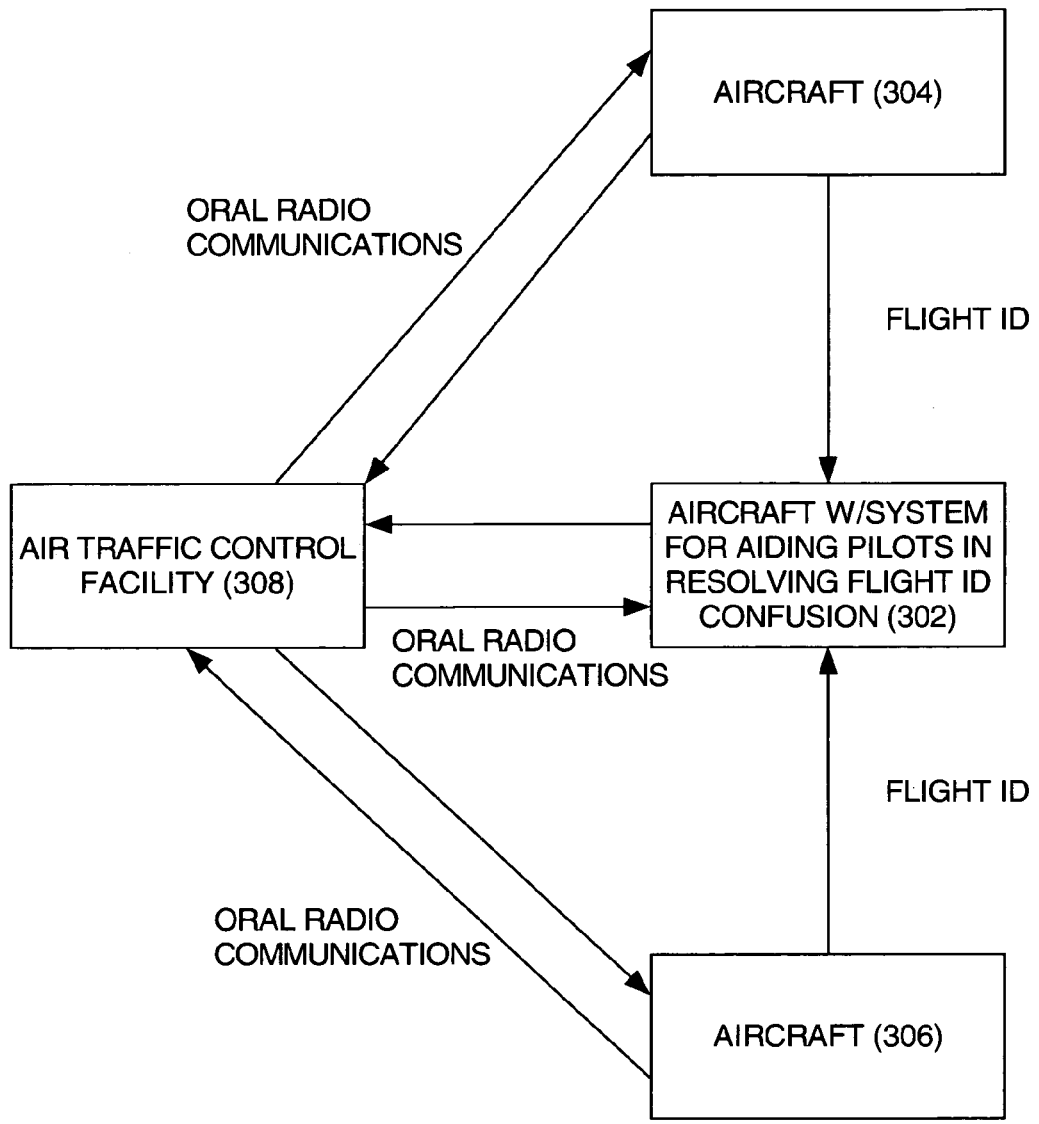
FIG. 3 is a block diagram illustrating a communications schematic including an aircraft implementing a system for aiding pilots in resolving flight ID confusion in accordance with an exemplary embodiment of the present invention, an air traffic control facility, and other aircraft located in substantially proximal airspace as the system-implementing aircraft.

FIG. 3 illustrates a block diagram communications schematic including an aircraft 302 implementing the system 200 of the present invention. The system 200 of the system-implementing aircraft 302 may receive flight IDs from one or more additional aircraft 304, 306 located within substantially proximal airspace. As discussed above, the system 200 may compare two received flight IDs, and if the compared flight IDs are at least substantially similar, an alert may be provided to a pilot of the system-implementing aircraft 302. The pilot of the system-implementing aircraft 302 may then radio an air traffic controller at an air traffic control facility 308, to notify the air traffic controller of this potentially confusing/dangerous situation, so that the air traffic controller may then be better able to coordinate activities of the aircraft (302, 304 and 306). Again, it is contemplated that the system 200 of the present invention may also be implemented on each of the one or more aircraft (302, 304, 306) and/or at the air traffic control facility 308.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for aiding a pilot in resolving flight identifier (flight ID) confusion, comprising:
   receiving a first flight ID in an onboard processor, the onboard processor located on a first aircraft;
   comparing, within the onboard processor, the first flight ID to a second flight ID, said second flight ID being stored in an onboard memory, the onboard memory associated with the onboard processor, the onboard memory located on the first aircraft; and
   providing an alert to the pilot of the first aircraft with an onboard alerting device when the compared first flight ID and second flight ID meet a pre-determined similarity threshold, the alert provided without a ground-based signal;
   wherein the first flight ID is associated with a second aircraft, the second flight ID is associated with one of: the first aircraft and a third aircraft, the first, second and third aircraft being within a pre-defined proximity to each other.

2. A method as claimed in claim 1, further comprising:
   providing an audio alert and a visual alert to the pilot of the first aircraft with the onboard alerting device when the second flight ID is associated with the first aircraft.

3. A method as claimed in claim 1, wherein the processor, memory and alerting device are part of a Traffic Alert a Collision Avoidance System (TCAS), the TCAS located on the first aircraft.

4. A method as claimed in claim 3, wherein the Traffic Alert & Collision Avoidance System (TCAS) includes an Automatic Dependent Surveillance Broadcast (ADS-B) functionality Traffic Computer located on the first aircraft.

5. A method as claimed in claim 1, wherein the processor, memory and alerting device are part of a Configurable Integrated Surveillance System (CISS) located on the first aircraft.

6. A method as claimed in claim 1, wherein the processor, memory and alerting device are part of an Integrated Surveillance System (ISS) located on the first aircraft.

7. A method as claimed in claim 1, wherein the processor, memory and alerting device are part of a Traffic Surveillance System (TSS) located on the first aircraft.

8. A non-transitory computer-readable medium onboard a first aircraft, the non-transitory computer readable medium having non-transitory computer-executable instructions executable by an onboard processor or a computer device, the computer-executable instructions comprise:
   receiving data onboard the first aircraft, the data including:
      information associated with a first flight ID, information associated with a second flight ID, and information associated with the first aircraft ID, the information including at least flight ID information and position information, the data received without a ground based signal;
   storing said data in an onboard storage device, the onboard storage device in data communication with the onboard processor or computer device;
   comparing the information associated with the first flight ID to at least one of: the information associated with the second flight ID and the information associated with the first aircraft ID, and
   providing an alert to the pilot of the first aircraft when the comparing meets a predetermined similarity threshold and a pre-defined proximity threshold.

9. The non-transitory computer readable medium onboard the first aircraft of claim 8, wherein the non-transitory computer-executable instructions for providing an alert further comprises:
   comparing the information associated with the first aircraft ID with at least one of the information associated with the first flight ID and the information associated with the second flight ID; and
   providing an audio alert and a visual alert to the pilot of the first aircraft on an alerting device onboard the first aircraft operatively connected to the computer device or processor, when the comparing meets the predetermined similarity threshold and the predefined proximity threshold.

10. A system for aiding a pilot of a first aircraft in resolving flight identifier (flight ID) confusion, comprising:
    a memory, the memory located onboard the first aircraft;
    a processor located onboard the first aircraft configured for being communicatively coupled to the memory, the processor being configured for receiving a first flight ID, the processor further being configured for comparing the first flight ID to a second flight ID, the second flight ID being at least one of: received by the processor and stored in the memory of the system; and
    an alerting device located onboard the first aircraft, the alerting device configured for being communicatively coupled with the processor, the alerting device configured for providing an alert to the pilot of the first aircraft when the compared first flight ID and second flight ID meet a predetermined similarity threshold,
    wherein the first flight ID is associated with a second aircraft, the second flight ID is associated with at least one of: the first aircraft and a third aircraft, the first, second and third aircraft being located within a pre-defined proximity to each other.

11. A system as claimed in claim 10, wherein the alerting device is configured for providing an audio alert and a visual alert when one of the first flight ID and the second flight ID is associated with ownship.

12. A system as claimed in claim 10, wherein the alerting device is at least one of an air traffic display and an alert display.

13. A system as claimed in claim 10, wherein the alerting device is a Cockpit Display of Traffic Information (CDTI) display, the CDTI located on the first aircraft.

14. A system as claimed in claim 10, wherein the alerting device is an Integrated Multi-Function Display (iMFD) located on the first aircraft.

15. A system as claimed in claim 10, wherein the alerting device is an Engine Indication and Crew Alerting System (EICAS) display located on the first aircraft.

16. A system as claimed in claim 10, wherein the alerting device is an Electronic Flight Bag (EFB) display located on the first aircraft.

* * * * *